US007107054B2

(12) United States Patent
Florkey et al.

(10) Patent No.: US 7,107,054 B2
(45) Date of Patent: Sep. 12, 2006

(54) RECONNECTION OF WIRELESS CALLS TO MOBILE UNITS IN BORDER CELLS

(75) Inventors: Cynthia Florkey, Chicago, IL (US); Ruth Schaefer Gayde, Naperville, IL (US); Victoria Marie Halsell, Aurora, IL (US); Karla Rae Hunter, Naperville, IL (US); E-Ling Lou, Naperville, IL (US)

(73) Assignee: Lucent Technologies Inc., Murray Hill, NJ (US)

( * ) Notice: Subject to any disclaimer, the term of this patent is extended or adjusted under 35 U.S.C. 154(b) by 222 days.

(21) Appl. No.: 10/761,068

(22) Filed: Jan. 20, 2004

(65) Prior Publication Data

US 2005/0159161 A1 Jul. 21, 2005

(51) Int. Cl.
*H04Q 7/20* (2006.01)
(52) U.S. Cl. .................. 455/436; 455/422.1; 455/445; 455/423
(58) Field of Classification Search ................ 455/436, 455/437, 438, 442, 414.1, 403, 412.1, 412.2, 455/450; 370/310, 329, 335, 328, 331
See application file for complete search history.

(56) References Cited

U.S. PATENT DOCUMENTS

| 5,802,472 | A  | * | 9/1998  | Taniguchi ................... 455/445 |
| 6,032,040 | A  | * | 2/2000  | Choy et al. ............... 455/414.1 |
| 6,058,320 | A  | * | 5/2000  | Yokota ....................... 455/574 |
| 6,169,900 | B1 | * | 1/2001  | Lahtinen ...................... 455/439 |
| 6,246,872 | B1 | * | 6/2001  | Lee et al. ................ 455/414.1 |
| 6,343,216 | B1 | * | 1/2002  | Kim et al. .................... 455/450 |
| 6,445,918 | B1 | * | 9/2002  | Hellander .................... 455/423 |
| 6,633,555 | B1 | * | 10/2003 | Lu et al. ..................... 370/331 |
| 6,721,572 | B1 | * | 4/2004  | Smith et al. ............. 455/456.1 |
| 6,795,444 | B1 | * | 9/2004  | Vo et al. ..................... 370/401 |
| 6,810,263 | B1 | * | 10/2004 | Cheng et al. ............... 455/510 |
| 6,990,349 | B1 | * | 1/2006  | Idrissi ........................ 455/450 |
| 2002/0068586 | A1 | * | 6/2002 | Chun et al. ................. 455/458 |
| 2002/0090947 | A1 | * | 7/2002 | Brooks et al. ............. 455/436 |
| 2003/0207688 | A1 | * | 11/2003 | Nikkelen .................... 455/439 |
| 2004/0063471 | A1 | * | 4/2004 | Kindo et al. ................ 455/566 |
| 2004/0185823 | A1 | * | 9/2004 | Chin et al. ............... 455/404.1 |

(Continued)

*Primary Examiner*—Jean Gelin
(74) *Attorney, Agent, or Firm*—Steven R. Santema

(57) ABSTRACT

Reconnection of a mobile unit to a call session controlled by a first MSC is supported responsive to a network-initiated or mobile-originated reconnect attempt even in instances where the mobile unit has roamed to a border cell controlled by a second MSC. In a network-initiated reconnect attempt, the first MSC sends a suspended call page request to a second MSC. The second MSC pages the mobile unit, sets up a bearer channel to the mobile unit, and sends to the first MSC a suspended call page response including indicia of the bearer channel set up by the second MSC. The first MSC establishes a bearer channel to the second MSC thereby reconnecting the mobile unit to the call session. In a mobile-originated reconnect attempt, the mobile unit sends a mobile-originated reconnect message to the second MSC. If the second MSC does not find session information associated with the call, it sends a suspended call handoff request to the first MSC causing the first MSC to query a database to find indicia of the call session, establish a bearer channel to the second MSC and send to the second MSC a suspended call handoff acknowledgement including information associated with the call session. The second MSC establishes a bearer channel to the mobile unit thereby reconnecting the mobile unit to the call session.

9 Claims, 6 Drawing Sheets

U.S. PATENT DOCUMENTS

2004/0203918 A1* 10/2004 Moriguchi et al. ...... 455/456.1
2004/0235509 A1* 11/2004 Burritt et al. ............... 455/519
2005/0054339 A1* 3/2005 Merritt ....................... 455/423
2005/0070286 A1* 3/2005 Awasthi et al. ............. 455/436

* cited by examiner

US 7,107,054 B2

RECONNECTION OF WIRELESS CALLS TO MOBILE UNITS IN BORDER CELLS

FIELD OF THE INVENTION

This invention relates generally to wireless communication systems, and, more particularly, to methods for reconnecting calls following service interruptions in a wireless communication system.

CROSS REFERENCE TO RELATED APPLICATIONS

This application is related to application Ser. No. 10/761,067, titled "Mobile-Originated Reconnection of Dropped Wireless Calls," filed concurrently with the present application, assigned to the assignee of the present invention and incorporated herein by reference in its entirety.

BACKGROUND OF THE INVENTION

Wireless communication systems are well known in which mobile units can initiate or receive calls while roaming between different radio frequency (RF) coverage areas (sometimes referred to as "cells"). The mobile units communicate via RF resources with base stations distributed among the cells, which base stations are controlled by one or more mobile switching centers (MSCs). The MSCs provide control signaling for the call and connect the mobile unit to other participating endpoints, which may comprise other mobile units or wireline units.

Occasionally, mobile units can encounter periodic service interruption(s) during a call, for example, upon entering a tunnel or reaching a fringe RF coverage area or due to a handoff error, causing the mobile unit to become dropped (at least temporarily) from the call. In such case, network-initiated reconnect attempts are known whereby the MSC attempts to page the mobile unit to find its location, reconnect the mobile unit and preserve the call. However, network-initiated reconnects can be wasteful in terms of network resources and bandwidth, most particularly when there are multiple dropped calls and hence multiple pages flooding the network. An alternative manner of reconnect, called a mobile-originated reconnect, is disclosed in related patent application Ser. No. 10/761,067. In the mobile-originated reconnect, the mobile unit itself initiates reconnect of a call by sending a mobile-originated reconnect (MORC) message to the network. After receiving the MORC message, the network attempts to identify a suspended communication session involving the mobile unit and, if a suspended session is so identified within a designated time, the network performs reconnection of the call. In such manner, the suspended session becomes reconnected without relying on network paging.

A problem that affects both of the above reconnect approaches is that mobile unit(s) may roam between base station sites controlled by different MSCs during the service interruption (as would occur, for example, when mobile units roam between different communication systems). This is known as a border cell problem. In the case of network-initiated reconnects, movement of the mobile unit to a border cell inhibits the ability of the serving MSC to page the mobile unit and reconnect the call. Indeed, the page may never be received if the mobile unit moves away from the area of the serving MSC. Further, a mobile unit may hear a page from one base station and respond to another base station controlled by a different MSC. In the case of mobile-originated reconnects, movement of the mobile unit to a border cell may cause MORC messages to be received at a border MSC that has no record of the suspended communication session while, at the same time, the serving MSC (i.e., the MSC having a record of the suspended communication) expects but does not receive a MORC message. The net effect of unsuccessful reconnection is a decreased revenue stream for the service provider.

Accordingly, there is a need for methods to accommodate reconnection of wireless calls to mobile units in border cell situations, wherein mobile units have roamed to border cells controlled by border MSCs. Advantageously, the methods will support both network-initiated and mobile-originated reconnect approaches. The present invention is directed to addressing these needs.

SUMMARY OF THE INVENTION

The present invention provides for supporting network-initiated and mobile-originated reconnect attempts after service interruption to a mobile unit during a call.

In one embodiment, there is provided a method for performing a network-initiated reconnect of a mobile unit having experienced a service interruption during a call, whereby the call session is controlled by a first MSC and the mobile unit does not respond to a page attempt from the first MSC. The first MSC sends a suspended call page request to a second MSC. The second MSC pages the mobile unit and if the mobile unit responds to the page, the second MSC sets up a bearer channel to the mobile unit. The second MSC sends to the first MSC a suspended call page response including indicia of the bearer channel set up by the second MSC to the mobile unit. Thereafter, the first MSC receives the suspended call page response and establishes a bearer channel to the second MSC thereby reconnecting the mobile unit to the call session.

In another embodiment, there is provided a method for performing a mobile-originated reconnect of a mobile unit having experienced a service interruption during a call, whereby the call session is controlled by a first MSC and the mobile unit roams to a second MSC. The first MSC receives a suspended call handoff request from the second MSC, indicating that a mobile-originated reconnect message issued from the mobile unit was received by the second MSC but the second MSC could not find session information associated with the call. Responsive to the suspended call handoff request, the first MSC queries a database to find indicia of the call session, establishes a bearer channel to the second MSC and sends to the second MSC a suspended call handoff acknowledgement including information associated with the call session. Thereafter, the second MSC receives the suspended call handoff acknowledgement and establishes a bearer channel to the mobile unit thereby reconnecting the mobile unit to the call session.

In yet another embodiment, there is provided a method for performing network-initiated or mobile-originated reconnects of a mobile unit served by a first MSC when a service interruption is detected to the mobile unit. Bearer channels are maintained from the first MSC to the one or more participating units, at least temporarily, while awaiting possible reconnection of the mobile unit. When it is determined that the mobile unit has roamed to a location served by a second MSC, bearer channels are established from the second MSC to the mobile unit and between the first and second MSCs, thereby completing a reconnect of the mobile unit to the call. The step of determining may occur in the manner of a network-initiated reconnect whereby the first MSC sends a suspended call page request to the second MSC and in return, the second MSC sends a suspended call page response indicating presence of the mobile unit within the location served by the second MSC; or in the manner of a mobile-originated reconnect whereby the first MSC receives a suspended call handoff request from the second MSC indicating that the second MSC has received a mobile-originated reconnect (MORC) message issued by the mobile unit.

BRIEF DESCRIPTION OF THE DRAWINGS

The foregoing and other advantages of the invention will become apparent upon reading the following detailed description and upon reference to the drawings in which.

DESCRIPTION OF THE PREFERRED EMBODIMENT(S)

Figure 1:
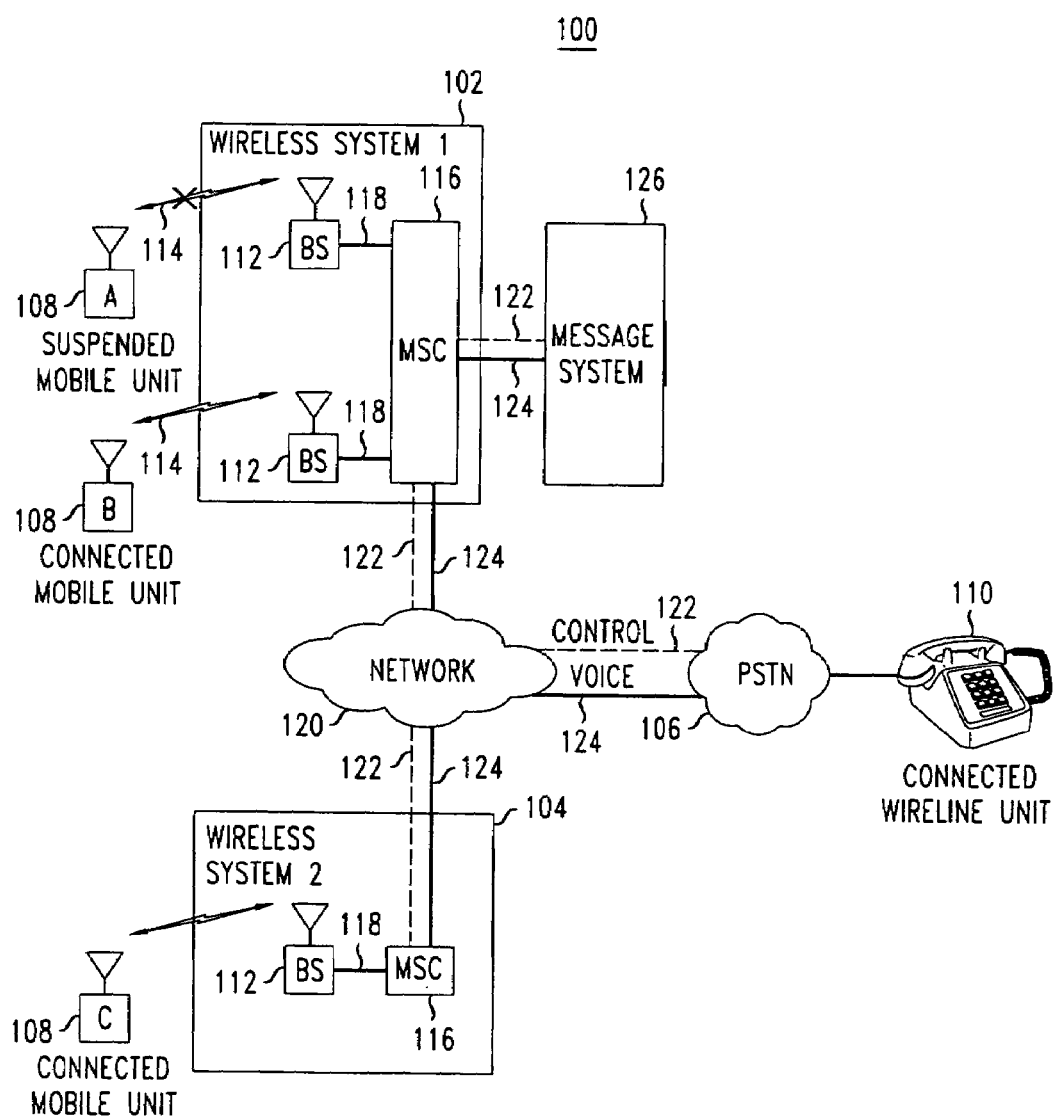
FIG. 1 is a block diagram of a communication system according to an exemplary embodiment of the present invention, illustrating a wireless mobile unit with dropped RF coverage.

FIG. 1 shows by way of example and not limitation, a wireless communication system 100 comprising a plurality of wireless subsystems 102, 104 ("Wireless System 1" and "Wireless System 2") interconnected to each other and to the public switched telephone network (PSTN) 106 by a network 120. The wireless subsystems 102, 104 may comprise public or private systems, or a combination thereof. As will be appreciated, although the wireless subsystems 102, 104 are shown as separate subsystems connected by a network 120, these systems may, in fact, be connected by a direct facility or integrated into a single wireless system connected to the PSTN 106. The network 120 may be implemented using any appropriate transmission, switching and routing technologies, as are known in the art, including but not limited to Internet Protocol (IP) and Asynchronous Transfer Mode (ATM) technologies.

Distributed among the wireless subsystems 102, 104 is a plurality of mobile units 108 (denoted "A," "B" and "C") and attached to the PSTN is a wireline unit 110 ("D"). The mobile units 108 comprise wireless devices that may include, but are not limited to, cell phones, two-way radios, laptop computers, personal digital assistants (PDAs) and the like having varying capacities to transmit information, such as voice, video, text or data traffic ("payload information") or control signaling ("control information") associated with communication service(s). The wireline unit 110 comprises generally any telephony device attached to the PSTN that is operable to exchange payload or control information associated with selected service(s) with the mobile units or with other wireline devices. The communication services may comprise, for example, wireless or wireline telephone service, electronic mail, facsimile service, paging service, short message service, electronic commerce, location service and/or packet data service.

The mobile units 108, generally, are adapted to roam between different RF coverage areas, sometimes referred to as "cells" (not shown) served by base stations 112. Each subsystem 102, 104 may include multiple base stations 112 serving multiple cells. The mobile units 108 communicate with the base stations 112 via RF resources 114 which may comprise narrowband frequency modulated channels, wideband modulated signals, broadband modulated signals, time division modulated slots, carrier frequencies, frequency pairs or generally any medium for communicating control or payload information to and from the mobile units. The RF resources may implement air interface technologies including but not limited to, CDMA, TDMA, GSM, UMTS or IEEE 802.11.

Wireless calls between and among the mobile units 108 and/or wireline units 110 are controlled by one or more telecommunication switching systems, exchanges or the equivalent, hereinafter termed mobile switching centers (MSCs) 116. The MSC(s) 116 may comprise, for example, AUTOPLEX™ switching systems, available from Lucent Technologies, Inc. As shown, separate MSCs 116 are contained within each of the subsystems 102, 104. As will be appreciated, however, a single MSC may control both subsystems (or a single, integrated system). The MSCs 116 include respective memory and processors (not shown), for storing and executing software routines for processing and switching calls, for providing various call features to calling parties and for providing access to the network 120 and PSTN 106. The MSCs 116 may be configured for operation with generally any suitable circuit, cell, or packet switching technology.

The MSCs 116 are connected to the base stations 112 by links 118, which may comprise, without limitation, Asynchronous Transfer Mode (ATM) links, ISDN lines, Ethernet LAN, wireless links, and the like. Links 122, 124 carry control and payload information, respectively, via network 120, between different MSCs 116, between MSC(s) and the PSTN 106 and, as shown, between the MSC of Wireless System 1 and a messaging system 126, such as a voice mail system. Although the links 122, 124 are shown as separate physical links carrying control and payload information, these links may be integrated into a single link carrying both control and payload information.

As shown, the payload information 124 comprises voice information. Alternatively or additionally, the payload information 124 may comprise information associated with video, data, text or generally any communication media. The messaging system 126 is not limited to a voice mail system but rather may comprise generally any appropriate system for wireless or wireline units to leave messages with other wireless or wireline units. The links 122, 124 are logical links that may be physically realized, without limitation, by conventional subscriber lines, ISDN lines, WAN links, wireless links, and the like.

In the exemplary embodiment of FIG. 1, it is presumed that the MSC(s) 116 had established a call between mobile unit A and one or more participating units B, C and D and, sometime during the call, service became interrupted to mobile unit A. (Hence, the "X" drawn through the RF channel 114 serving mobile unit A.) This might occur, for example, upon mobile unit A entering a tunnel or reaching a fringe RF coverage area. As will be described in greater detail in relation to FIGS. 3 and 4, the present invention provides a method for mobile unit A to originate reconnection of the call (i.e., to regain communication with units B, C and D), rather than relying on network-initiated reconnection that may or may not occur. In one embodiment, the mobile-originated reconnection provides the user an affirmative choice to attempt reconnection (or not). If a reconnection attempt is requested, the user knows to wait a period of time for the reconnection attempt to proceed before re-attempting a second call; if a reconnection attempt is not requested, the user may elect to place a second call substantially any time after declining the reconnection attempt. The second call may be to the same parties or different parties as the original call.

Figure 2:
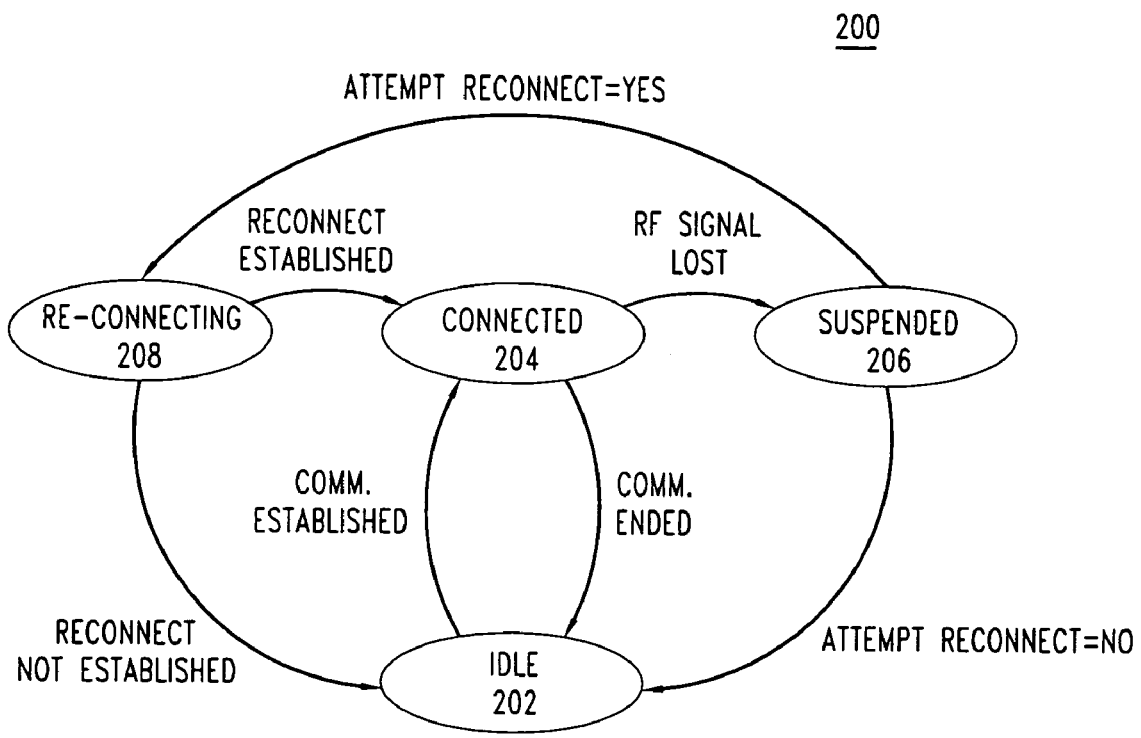
FIG. 2 is a state diagram illustrating various call states supported by a communication system of the type shown in FIG. 1 according to an embodiment of the present invention.

FIG. 2 is a state diagram 200 illustrating various call states supported by a communication system of the type shown in FIG. 1. The call states include an IDLE state 202, CONNECTED state 204, SUSPENDED state 206 and RECONNECTING state 208. Each mobile unit having registered with an MSC occupies one of the call states, but the mobile units may occupy different call states at different times. In one embodiment, each individual mobile unit keeps track of its present call state; and the respective call states of one or more mobile units are also tracked by serving MSCs (i.e., the MSCs serving the respective locations of the mobile units). In one embodiment, state machines and/or memory residing within the mobile units and MSCs record the various call states. Alternatively or additionally, state machines and/or memory recording call states of the mobile units may reside in separate network elements in communication with the MSCs.

Generally, a mobile unit is in the IDLE state 202 when it is not presently engaged in a call involving other mobile units or wireline units. That is, a mobile unit in the IDLE state does not presently require a bearer channel (e.g., voice channel) to support a call. Nevertheless, in the IDLE state, the mobile unit may communicate control messages with a serving MSC for mobility management purposes and the like.

A mobile unit enters the CONNECTED state 204 from the IDLE state 202 when it initiates or receives a call and a bearer channel is established to support the call. The mobile unit remains in the CONNECTED state for so long as it continues to participate in the call. If the mobile unit voluntarily ends its participation in the call, the call state moves from the CONNECTED to the IDLE state. If the bearer channel to the mobile unit is interrupted during the call (as would occur, for example, if the mobile unit loses RF coverage), the call state moves from the CONNECTED to the SUSPENDED state 206.

While in the SUSPENDED state, the mobile unit has lost (at least temporarily) the ability to participate in the call, but other end parties may still have bearer channels connected to the call (i.e., remaining in the CONNECTED state). For convenience, the term "suspended session" will refer to a communication with at least one party in the SUSPENDED state. According to an embodiment of the present invention, information identifying suspended session(s) is maintained by MSCs (or network elements in communication with the MSCs) and the connected legs of the session(s) are maintained, at least temporarily, to allow for possible reconnection of the SUSPENDED mobile units to the call(s). According to principles of the present invention, a user of a mobile unit in the SUSPENDED state may affirmatively choose to originate a reconnect attempt. Alternatively, the network may initiate a reconnect attempt. In either case, the call state moves from the SUSPENDED state to the RECONNECTING state 208. If the user declines to originate a reconnect (and the network does not initiate a reconnect), the call state returns to the IDLE state 202.

When in the RECONNECTING state, an attempt is made to reconnect the mobile to the suspended session. The reconnect attempt may occur responsive to a mobile-originated reconnect or network-initiated reconnect. If the reconnect is established, the call state returns to the CONNECTED state and the call may resume with the original parties. If the reconnect is not established within a designated time period, the call state returns to the IDLE state.

Figure 3:
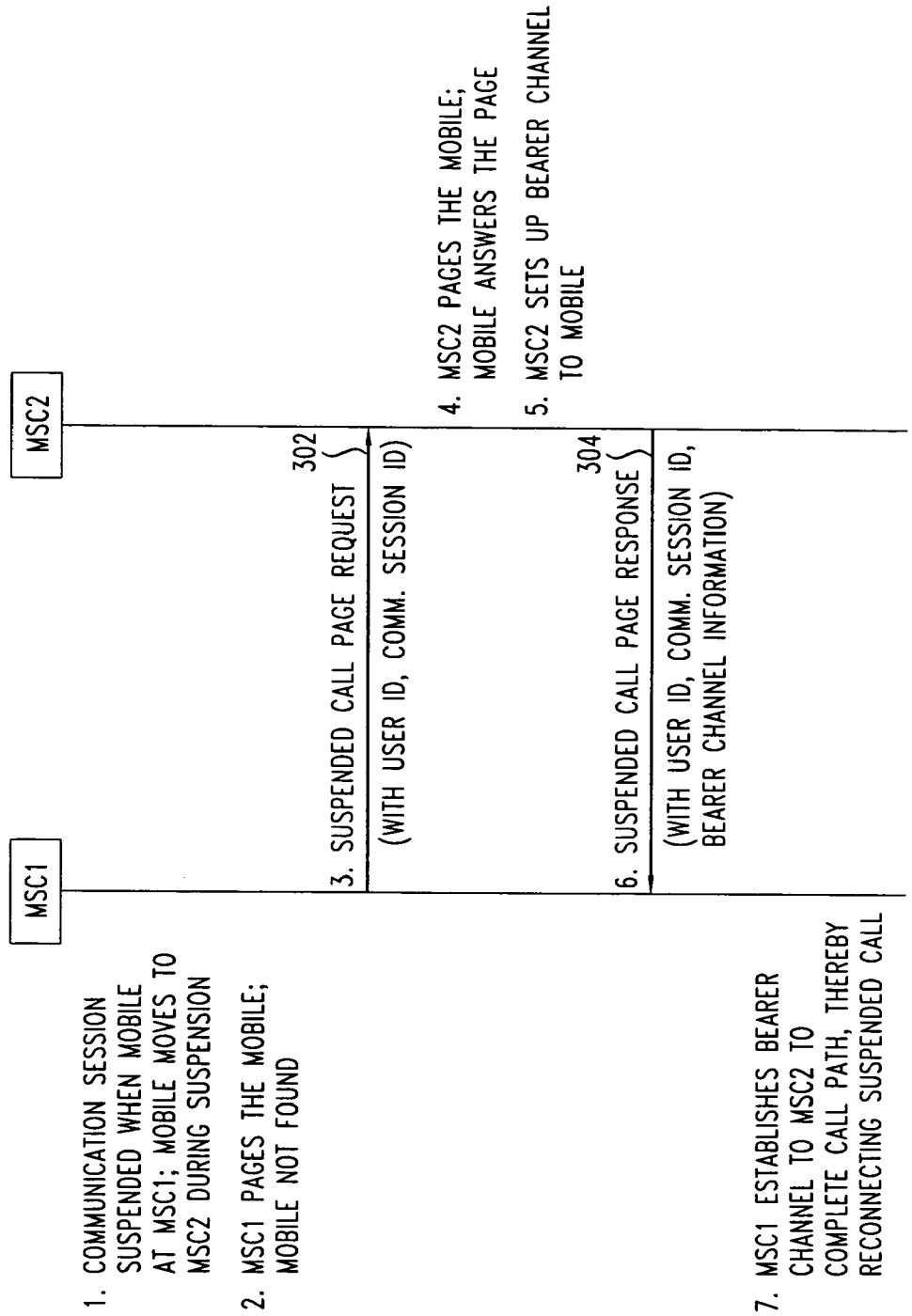
FIG. 3 is a message sequence chart according to an exemplary embodiment of the present invention, showing messages exchanged between a serving MSC and border MSC in a network-initiated reconnect of a mobile unit in a border cell situation.
Figure 4:
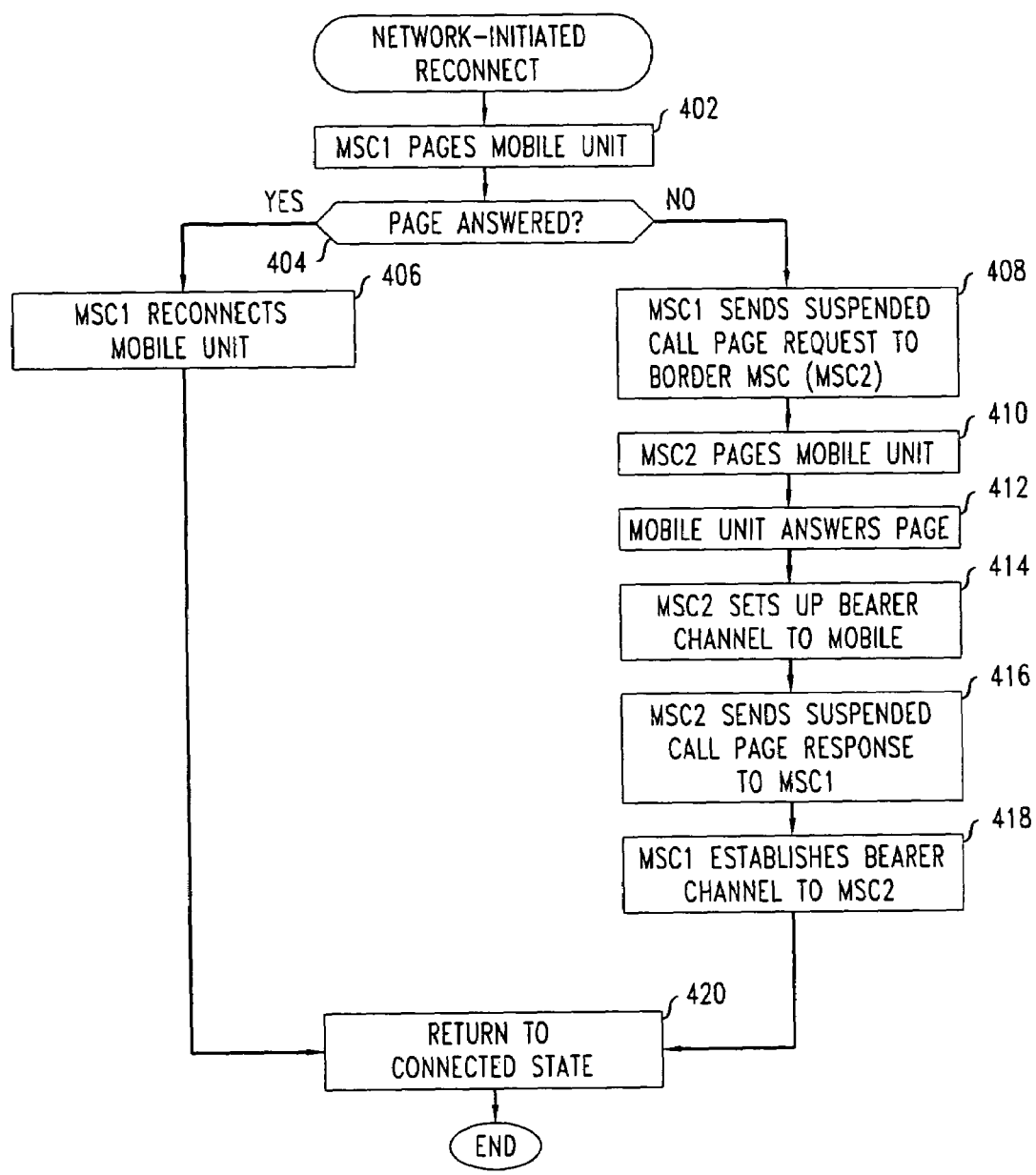
FIG. 4 is a flowchart of a method for performing a network-initiated reconnect of a mobile unit in a border cell situation according to an embodiment of the present invention.

FIG. 3 shows a message sequence for performing a network-initiated reconnect of a mobile unit in a border cell situation. FIG. 4 shows a method for performing a network-initiated reconnect of a mobile unit in a border cell situation. The message sequence and method both presume a communication session is established with a mobile unit at a first MSC ("MSC1") and, following an interruption of service to the mobile unit, a network-initiated reconnect is attempted. The mobile unit may roam (or not) to a second MSC ("MSC2") during the service interruption, which second MSC could be in a second wireless system. Thus, the network may reconnect the mobile unit with the same entity (e.g., MSC1) that is controlling the suspended session or a different entity (e.g., MSC2). For example, with reference to FIG. 1, presuming the suspended mobile unit "A" established a communication session in Wireless System 1, the network may initiate a reconnect while mobile unit A remains in Wireless System 1 or after mobile unit A has roamed to Wireless System 2. In the former case, MSC1 comprises the MSC 116 associated with Wireless System 1 and there is no MSC2. In the latter case, MSC1 comprises the MSC 116 associated with Wireless System 1 and MSC2 comprises the MSC 116 associated with Wireless System 2. Until such time as the reconnect is successful (or failed), the mobile unit is in the RECONNECTING state. The message sequence and method are implemented, where applicable, using stored software routines within the MSCs 116, base stations 112 and/or mobile units 108 of the communication system 100.

Referring to FIG. 4, the network-initiated reconnect begins at step 402, where MSC1 pages the mobile unit (e.g., mobile unit A) and waits a predetermined period of time for a response as known in the art. If the page is answered, determined at step 404, the mobile unit is in fact within an area served by MSC1 and communicating with a base station 112 of Wireless System 1. In such case, at step 406, MSC1 reconnects the mobile unit to the call; and at step 420, the mobile unit returns to the CONNECTED state. It is presumed at step 406 that MSC1 has a record of suspended calls and is able to identify which call is associated with the mobile unit responsive to receiving the page response from the mobile unit. If the mobile unit does not answer the page (or the page is answered but not communicated to MSC1), MSC1 determines that the mobile unit is no longer within its coverage area. MSC1 does not yet know the actual location of the mobile unit. For example, with reference to FIG. 1, if the MSC associated with Wireless System 1 ("MSC1") pages the mobile unit and does not receive a response, it determines that mobile unit A is no longer in its coverage rea (as would occur, for example, if mobile unit A roamed to Wireless System 2 during the service interruption); but MSC1 does not yet know the location of mobile unit A.

In attempt to determine the location of the mobile unit, MSC1 sends at step 408 a suspended call page request 302 to one or more border MSCs. For purposes of the present example, it is presumed that MSC1 sends a suspended call page request to MSC2 and the mobile unit is indeed located within the coverage area of MSC2. However, it is noted, MSC1 still does not know the location of the mobile unit and MSC1 may need to send suspended call page requests to multiple MSCs before locating the mobile unit. In one embodiment, the suspended call page request 302 includes a user ID associated with the suspended mobile unit and a communication session ID associated with the suspended communication. At step 410, responsive to the suspended call page request 302, MSC2 pages the mobile unit. The mobile unit answers the page at step 412, thereby indicating to MSC2 that the mobile unit is within the coverage area of MSC2. Thus, continuing the previous example, presume the MSC associated with Wireless System 2 ("MSC2") receives a suspended call page request 302 from MSC1 and in turn, pages mobile unit A and receives a response. In such case, MSC2 knows that mobile unit A, which is in the SUSPENDED call state with the suspended call controlled by MSC1, is presently within the coverage area of MSC2.

Next, at step 414, MSC2 sets up a bearer channel for the mobile unit. Thus, continuing the present example, MSC2 reserves RF resources 114 within Wireless System 2 to support reconnection of mobile unit A to the suspended call. At step 416, MSC2 sends a suspended call page response message 304 to MSC1, thereby informing MSC1 that suspended mobile unit A is presently located within the coverage area of MSC2. In one embodiment, the suspended call page response message 304 includes a user ID associated with the suspended mobile unit, a communication session ID associated with the suspended communication and bearer channel connection information associated with the RF resources within Wireless System 2. At step 418, MSC1 establishes a bearer channel to MSC2 thereby linking Wireless System 1 and Wireless System 2 and reconnecting mobile unit A to the formerly suspended call; and at step 420, the mobile unit returns to the CONNECTED state. The suspended call page request 302 and suspended call page response 304 are preferably compatible with the ANSI-41 protocol promulgated by the American National Standards Institute.

Figure 5:
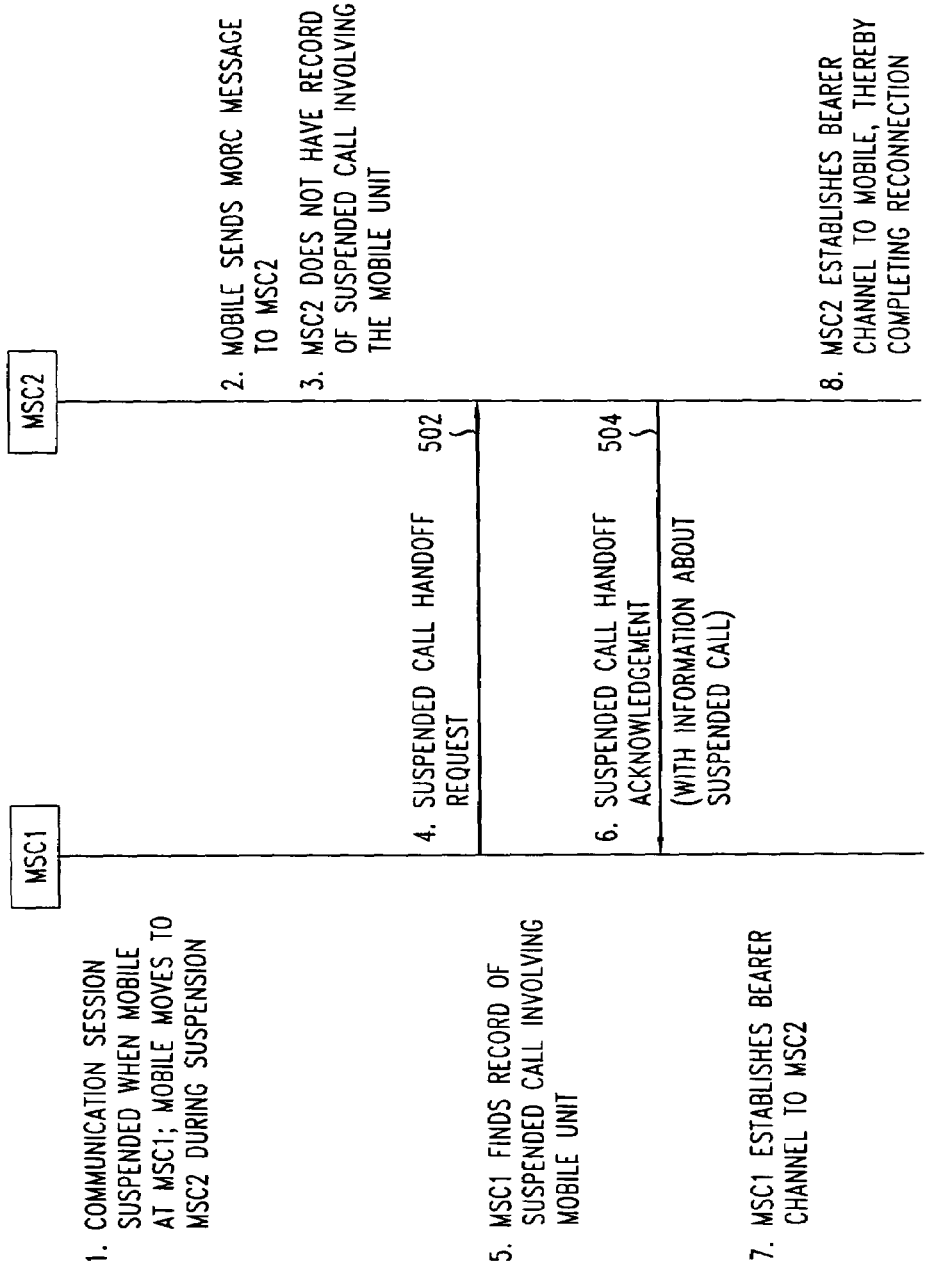
FIG. 5 is a message sequence chart according to an exemplary embodiment of the present invention, showing messages exchanged between a serving MSC and border MSC in a mobile-originated reconnect of a mobile unit in a border cell situation.
Figure 6:
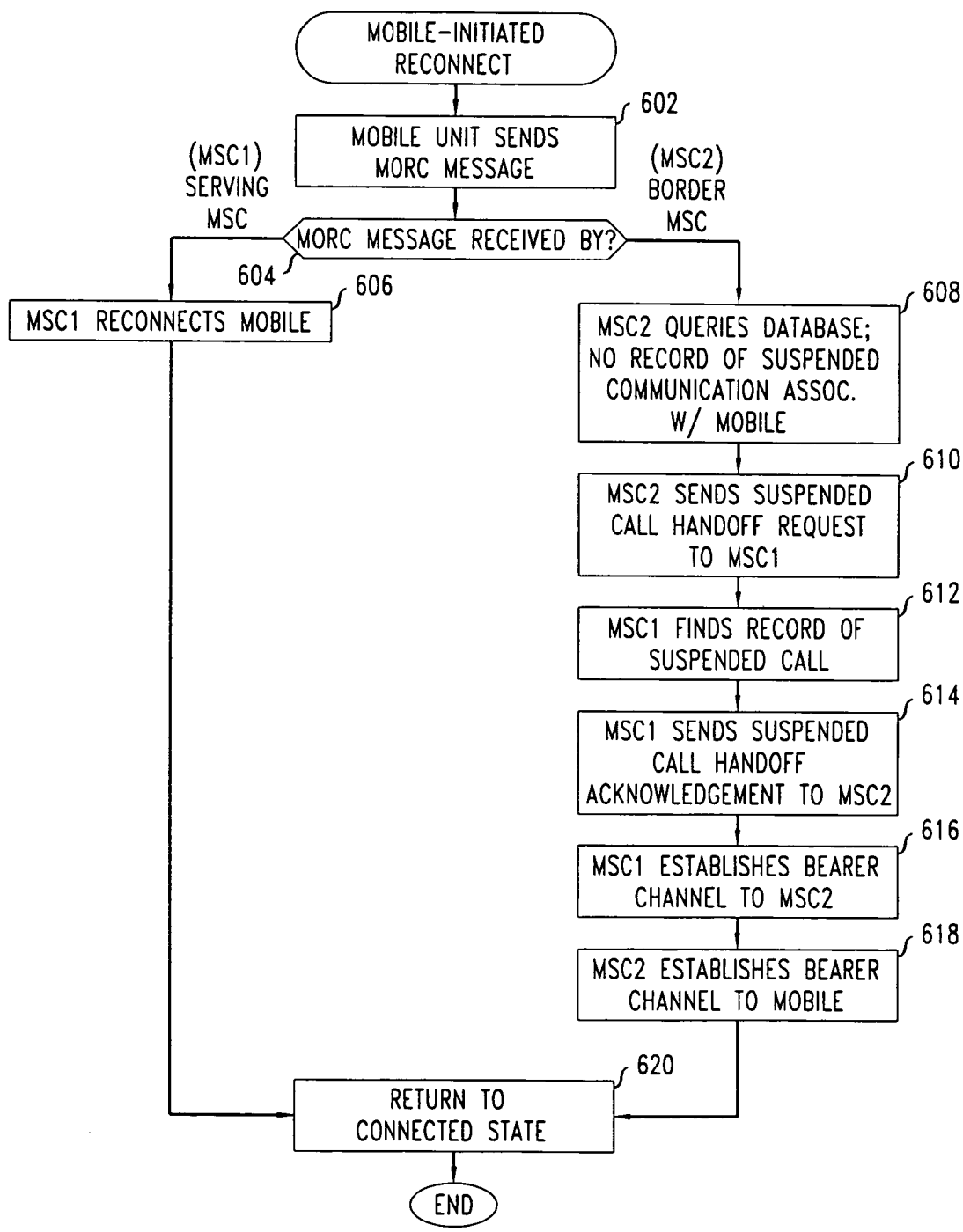
FIG. 6 is a flowchart of a method for performing a mobile-originated reconnect of a mobile unit in a border cell situation according to an embodiment of the present invention.

FIG. 5 shows a message sequence for performing a mobile-initiated reconnect of a mobile unit in a border cell situation. FIG. 6 shows a method for performing a mobile-initiated reconnect of a mobile unit in a border cell situation. The message sequence and method both presume a communication session is established with a mobile unit at a first MSC ("MSC1") and, following an interruption of service to the mobile unit, a mobile-initiated reconnect is attempted. Similarly to the network-initiated reconnect message sequence (FIG. 3) and method (FIG. 4), the mobile unit may roam (or not) to a second MSC ("MSC2") during the service interruption, which second MSC could be in a second wireless system. Thus, the mobile unit may attempt reconnect with the same entity (e.g., MSC1) that is controlling the suspended session or a different entity (e.g., MSC2). The message sequence and method are implemented, where applicable, using stored software routines within the MSCs 116, base stations 112 and/or mobile units 108 of the communication system 100.

Referring to FIG. 6, the mobile-initiated reconnect begins at step 602, where the mobile unit (e.g., mobile unit A) sends a mobile-initiated reconnect (MORC) message into the network. Generally, the MORC message includes information that will enable the network to reconnect the mobile unit to its last communication session (i.e., the suspended session). In one embodiment, the information includes indicia of the mobile unit (e.g., user device ID) and indicia of the last communication session (e.g., communication session ID). The last communication session may have been an originating or terminating session with respect to the mobile unit. The MORC message may be received by a serving MSC (e.g., MSC1, Wireless System 1) controlling the suspended communication or by a border MSC (e.g., MSC2, Wireless System 2) not having a record of the suspended communication, which is determined at step 604.

If the MORC message is received by MSC1, the mobile unit is in fact within an area served by MSC1 and communicating with a base station 112 of Wireless System 1. In such case, at step 606, MSC1 reconnects the mobile unit to the call; and at step 620, the mobile unit returns to the CONNECTED state. It is presumed at step 606 that MSC1 has a record of suspended calls and is able to identify which call is associated with the mobile unit responsive to receiving the MORC message from the mobile unit.

If the MORC message is received by MSC2, the mobile unit is presently within the coverage area of MSC2 within Wireless System 2. MSC2, like MSC1 maintains a record of suspended calls. At step 608, MSC2 queries its record of suspended calls to search for the suspended call involving mobile unit A; it is contemplated MSC2 will not find such a record because the suspended call involving mobile unit A is controlled by MSC1. (Alternatively, a centralized database may be utilized to allow MSC2 to find a record of the suspended call.) At step 610, in attempt to find a record of the suspended call, MSC2 sends a suspended call handoff request 502 to MSC1. In one embodiment, the suspended call handoff request includes information obtained from the MORC message (e.g., user device ID, communication session ID).

At step 612, responsive to receiving the suspended call handoff request, MSC1 queries its database of suspended communication sessions to find a record of a suspended call including the mobile unit. At step 614, MSC1 sends a suspended call handoff acknowledgement 504 to MSC2 indicating that MSC1 has a record of the call. In one embodiment, the suspended call handoff acknowledgement 504 includes information about the suspended call that allows MSC2 to connect a bearer path to the mobile unit to support the call. At step 616, MSC1 establishes a bearer channel to MSC2; and at step 618, MSC2 establishes a bearer channel to the mobile unit to complete reconnection of the call. At step 620, the mobile unit returns to the CONNECTED state. The suspended call handoff request 502 and suspended call handoff acknowledgement 504 are preferably compatible with the ANSI-41 protocol promulgated by the American National Standards Institute.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

What is claimed is:

1. A method of performing a mobile-originated reconnect of a mobile unit having experienced a service interruption during a call session controlled by a first mobile switching center (MSC), yielding a suspended call session, the method comprising the first MSC:

receiving, from a second MSC, a suspended call handoff request;

querying a database to find indicia of the suspended call session;

sending to the second MSC a suspended call handoff acknowledgement including information associated with the suspended call session; and establishing a bearer channel to the second MSC, so as to facilitate reconnecting the mobile unit to the suspended call session.

2. The method of claim 1, further comprising the second MSC:

receiving the suspended call handoff acknowledgement; and establishing a bearer channel to the mobile unit thereby reconnecting the mobile unit to the call session.

3. The method of claim 1, wherein the step of the first MSC receiving a suspended call handoff request is preceded by the second MSC:

receiving a mobile-originated reconnect (MORC) message issued by the mobile unit; and querying a database for indicia of the call session; and sending to the first MSC the suspended call handoff request responsive to not finding indicia of the call session.

4. In a wireless communication system wherein a call is established between a mobile unit and one or more participating units, the mobile unit being served by a first mobile switching center (MSC) when a service interruption is detected to the mobile unit, yielding a suspended call session, a method comprising a second MSC:

maintaining a database of session information associated with a plurality of suspended calls;

receiving a mobile-originated reconnect (MORC) message issued by the mobile unit, the MORC message including a mobile unit identifier associated with the mobile unit and indicating presence of the mobile unit within a location served by the second MSC;

querying the database for session information corresponding to the mobile unit identifier; and if session information corresponding to the mobile unit identifier is not found, sending from the second MSC to the first MSC, a suspended call handoff request indicating presence of the mobile unit within the location served by the second MSC.

5. The method of claim 4, further comprising the first MSC, responsive to receiving the suspended call handoff request from the second MSC:

retrieving session information associated with the interrupted call of the mobile unit; and sending to the second MSC, a suspended call handoff acknowledgement including at least a portion of the session information.

6. The method of claim 5, further comprising:

starting a wait timer defining a waiting period to allow for reconnect of the mobile unit to the call; and ending the call if the mobile unit is not reconnected to the call before expiration of the waiting period.

7. In a wireless communication system wherein a call is established between a mobile unit and one or more participating units, the mobile unit being served by a first mobile switching center (MSC) when a service interruption is detected to the mobile unit, yielding a suspended call session, a method comprising a second MSC:

maintaining a database of session information associated with a plurality of suspended calls;

receiving a mobile-originated reconnect (MORC) message issued by the mobile unit, the MORC message indicating presence of the mobile unit within a location served by the second MSC and including a session identifier associated with the suspended call session;

querying the database for session information corresponding to the session identifier; and if session information corresponding to the session identifier is not found, sending from the second MSC to the first MSC, a suspended call handoff request indicating presence of the mobile unit within the location served by the second MSC.

8. The method of claim 7, further comprising the first MSC, responsive to receiving the suspended call handoff request from the second MSC:

retrieving session information associated with the interrupted call of the mobile unit; and sending to the second MSC, a suspended call handoff acknowledgement including at least a portion of the session information.

9. The method of claim 8, further comprising:

starting a wait timer defining a waiting period to allow for reconnect of the mobile unit to the call; and ending the call if the mobile unit is not reconnected to the call before expiration of the waiting period.

* * * * *